Figure 4:
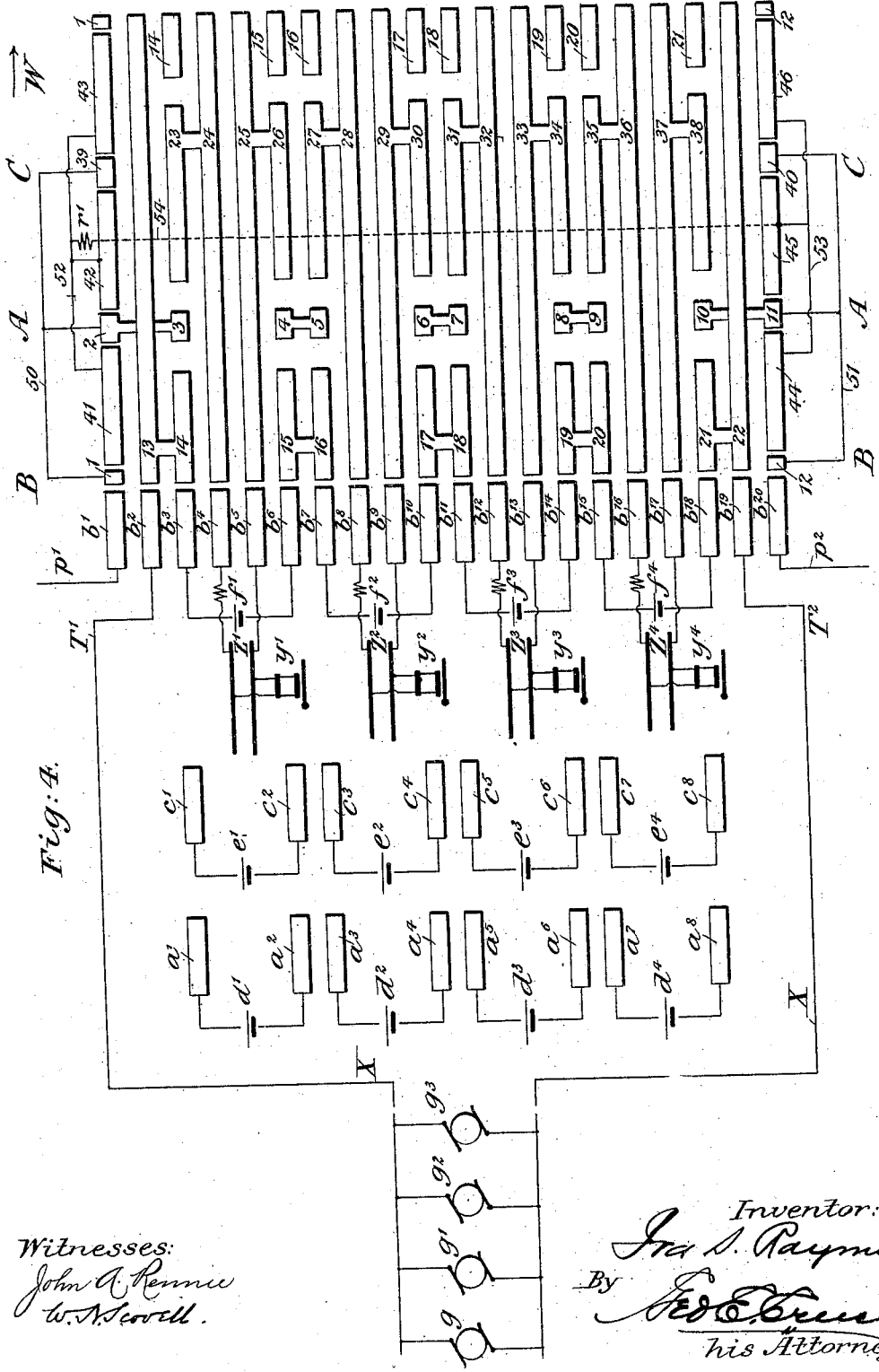

No. 838,583. PATENTED DEC. 18, 1906.
I. S. RAYMER.
SYSTEM FOR CHARGING STORAGE CELLS.
APPLICATION FILED AUG. 23, 1905.
4 SHEETS—SHEET 1.
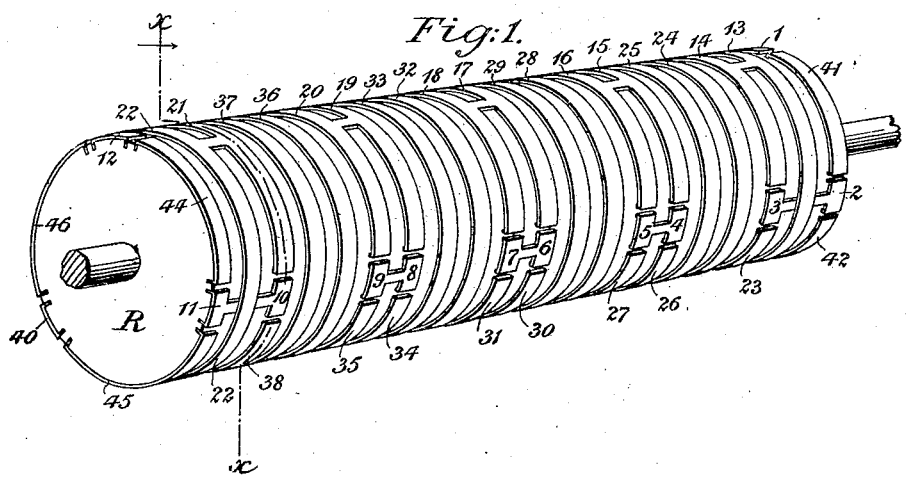
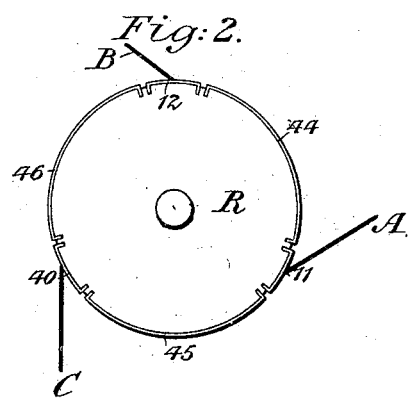
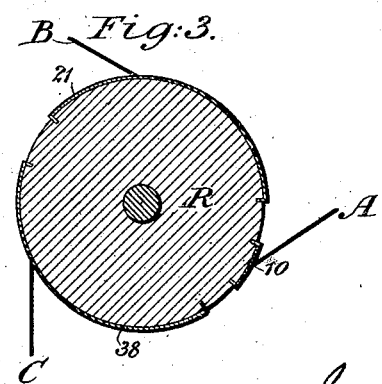
Witnesses:
John A. Rennie
W. N. Scovell
Inventor:
Ira S. Raymer
By Geo. E. Cruse
his Attorney

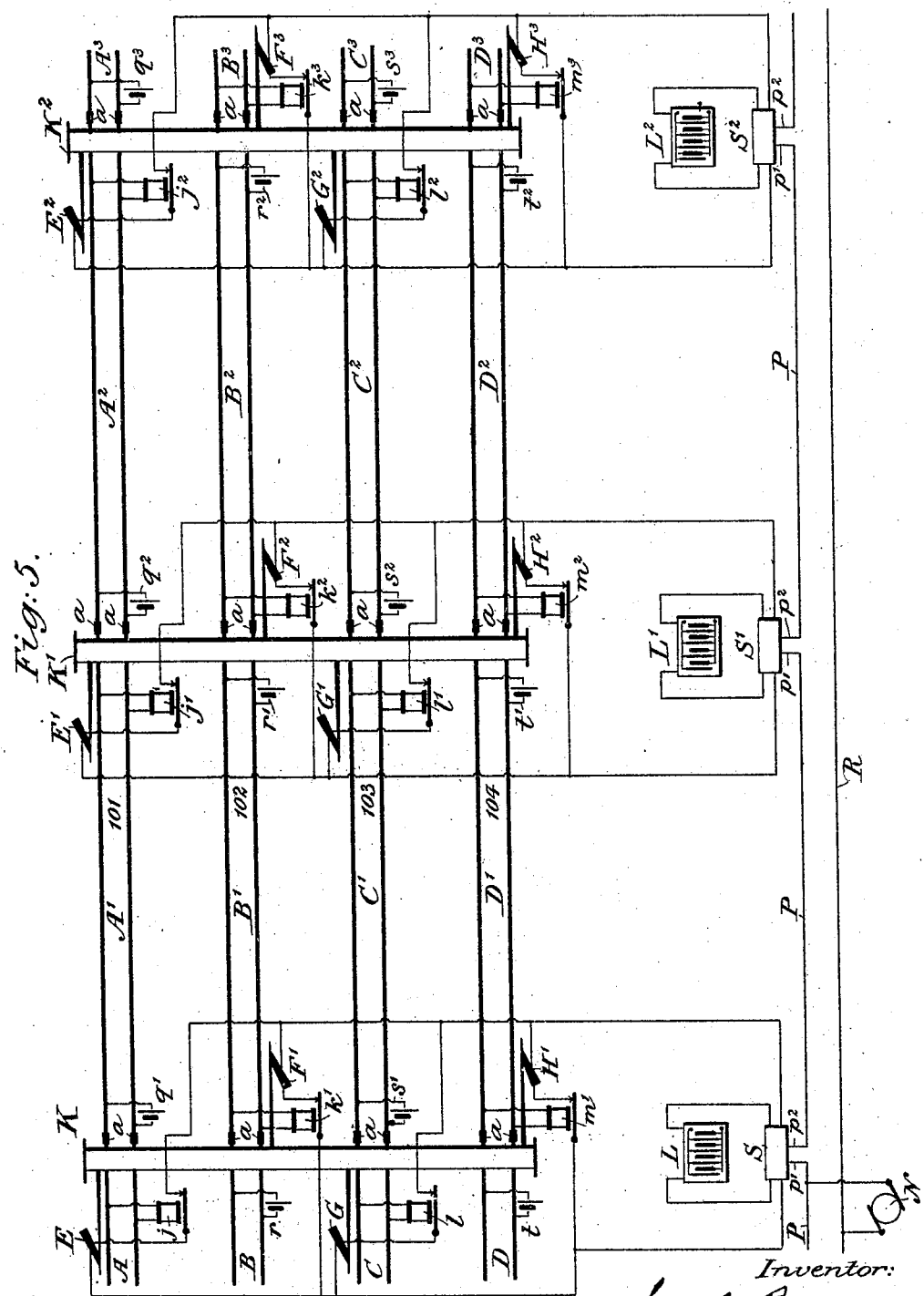

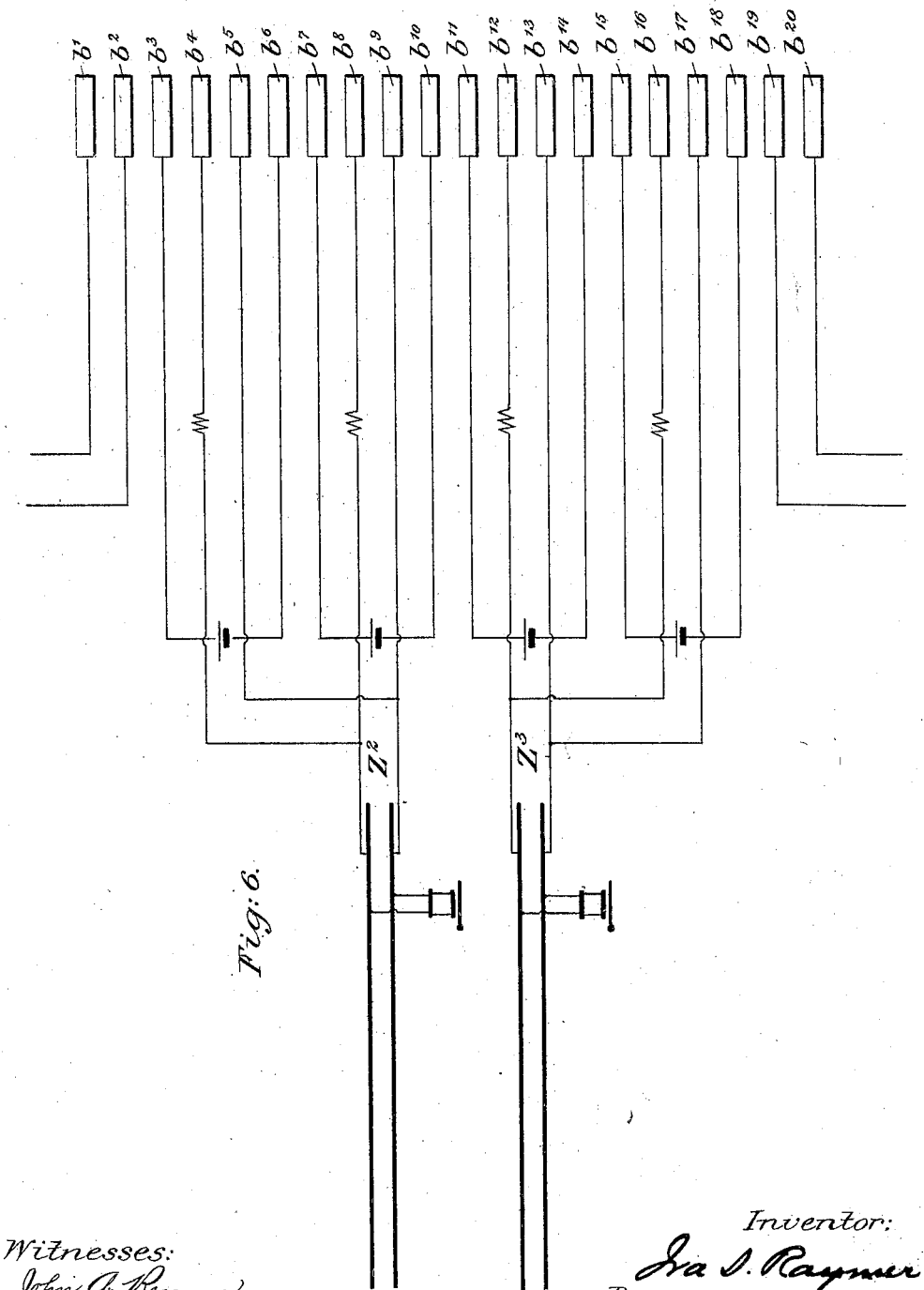

UNITED STATES PATENT OFFICE.

IRA S. RAYMER, OF BEAVER, PENNSYLVANIA.

SYSTEM FOR CHARGING STORAGE-CELLS.

No. 838,583. Specification of Letters Patent. Patented Dec. 18, 1906.

Application filed August 23, 1905. Serial No. 275,338.

*To all whom it may concern:*

Be it known that I, IRA S. RAYMER, a subject of the King of Great Britain and Ireland, residing at Beaver, in the county of Beaver and State of Pennsylvania, have invented certain new and useful Improvements in Systems for Charging Storage-Cells, of which the following is a specifiation.

My invention relates to systems in which a plurality of storage or secondary cells are charged from a common source of current-supply.

My invention is applicable particularly to such systems as are used in connection with railway signaling systems.

I will describe a system embodying my invention and will then point out the novel features thereof in claims.

In carrying out my invention I employ a circuit changing or shifting apparatus, which I will herein call a "commutator," and in describing the construction and operation of the said commutator I will choose for illustration a case where twelve storage-cells of like size and type are divided into three groups of four cells each and will show how the said commutator is employed to connect and disconnect, successively, each of the three groups of cells to and from their charging and discharging circuits. In the case chosen for illustration one set of four cells is connected, by means of the commutator embodying my invention, with the battery-charging circuit—that is, with the source of current-supply that is used for charging the cells—while a second set of four cells is connected in series with a discharging-circuit, and the third set is split up into its four constituent cells, and the said four cells are respectively connected to four other discharging-circuits. By shifting the commutator the first of the three above-mentioned sets of cells may be shifted from the charging-circuit and connected to the circuit to which the second set of cells was previously connected, the said second set is split up at the same time into its four constituent cells and connected to the four discharge-circuits, and the said third set of four cells is connected up at the same time in series to the charging-circuit. In like manner a further shifting of the commutator will once more transpose the three sets of cells, connecting the second set with the charging-line, the third set in series with the discharging-circuit, and splitting up the first set into four units of one cell each and connecting the said four cells, respectively, to the four above-mentioned circuits.

Referring to the accompanying drawings, Figure 1 is a perspective view of a commutator embodying my invention. Fig. 2 is an end view taken from the left-hand end of Fig. 1. Fig. 3 is a sectional view taken through the line $x\ x$ in Fig. 1; and Fig. 4 is a view of the commutator, showing how it would appear if its surface were developed into a plane. Fig. 5 illustrates a portion of a four-track railway comprising a signal system to which a system for charging storage-cells embodying my invention may be applied. Fig. 6 illustrates a modification of the external connections of the commutator.

Like numerals and letters of reference designate like parts in all the drawings.

R designates a roller or cylinder, of hard rubber or other suitable insulating material, adapted to be rotated on its longitudinal axis through any angle that may be desired, and 1 2 3, &c., designate contact-strips, of brass or other suitable conducting material, which are firmly attached, in any suitable manner, to the surface of the roller R and are relatively arranged thereon in the manner shown in the developed view Fig. 4. As stated above, the strips 1 2 3, &c., may be attached to the surface of the roller R in any desired suitable manner; but preferably I attach them by bending down the ends of the strips and inserting the ends thus bent down into longitudinal slots cut in the surface of the roller and provided for the purpose of gripping the said ends tightly, and thereby holding the strips in their proper relative positions.

A A, B B, and C C designate three rows of contact springs or brushes, $a'\ a^2 a^3$, &c., $b'\ b^2\ b^3$, &c., and $c'\ c^2\ c^3$, &c., which are suitably supported adjacent the roller R and are set at an angle of one hundred and twenty degrees from each other, as shown in Figs. 2 and 3. The said contact-springs are so constructed that they will always make a good electrical contact with the various strips 1 2 3, &c., with which they may respectively be engaged. There are eight contact-springs in row A, $a'$ $a^2\ a^3$, &c., and these are connected in pairs to the four cells of secondary battery $d'\ d^2\ d^3\ d^4$, one spring being connected to each terminal of each cell, as shown. In like manner the eight contact-springs of row C, $c'\ c^2\ c^3$, &c., are connected to the four cells $e'\ e^2\ e^3\ e^4$. Row B comprises twenty contact-springs $b'$ $b^2$ $b^3$, &c., and of this number two springs $b^3$ $b^6$ are connected, respectively, to the terminals of the cell $f'$; $b^7$ and $b^{10}$ are in like manner connected to the terminals of cell $f^2$; $b^{11}$ and $b^{14}$ to cell $f^3$, and $b^{15}$ and $b^{18}$ to cell $f^4$. Of the remaining twelve contacts eight contacts—namely, $b^4$, $b^5$, $b^8$, $b^9$, $b^{12}$, $b^{13}$, $b^{16}$, and $b^{17}$—are connected in pairs, respectively, to four discharging-circuits, which I have designated $Z'$ $Z^2$ $Z^3$ $Z^4$. Springs $b'$ and $b^{20}$ are connected, respectively, with the incoming and outgoing terminals $p'$ $p^2$ of conductor P, which is one of the two conductors conveying current for charging the cells from the source of current-supply N. (See Fig. 5.) The conductor P is connected to one terminal of the source of charging-current N, and the said conductor is looped in series through as many commutators S S' S², &c., as may be desired. In Fig. 5 I have shown three commutators thus connected to the charging-line P. The remaining conductor R is used as the return for the charging-current and is connected to the other terminal of the source N. Referring again to Fig. 4, the two contact-springs $b^2$ and $b^{19}$ are connected to conductors T' and T², which convey current from one or other of the three sets of cells $d'$, &c., $e'$, &c., $f'$, &c., to a discharging-circuit, which I have designated X. I will now trace the several circuits of the three batteries of cells—namely, $d'$ $d^2$, &c., $e'$ $e^2$, &c., and $f'$ $f^2$, &c.—through the contact springs and strips of the commutator and show how by means of the said commutator I am enabled to put each of the said batteries successively and in regular rotation into connection with the battery-charging circuit and the various discharging-circuits. As hereinbefore stated, the lines of contact of the three sets of contact-springs $a'$ $a^2$, &c., $b'$ $b^2$, &c., and $c'$ $c^2$, &c., with the contact-strips on the roller R, are arranged at an angle of one hundred and twenty degrees from each other. Referring to the developed view of the roller R, in Fig. 4 the lines A A, B B, and C C, respectively, designate the said lines of contact of the said three rows of springs. It will be seen that one terminal of the battery-charging line-wire or conductor P is connected at $p'$ to contact-spring $b'$ of row B B and in like manner the other terminal of the said conductor P is connected at $p^2$ to the contact-spring $b^{20}$. Current will therefore now flow from the source N through the conductor P to contact-spring $b'$ of the commutator, thence to contact-strip 1 with which $b'$ makes contact, thence to strip 2 along the connection 50, thence to strip 3, which is in contact with spring $a'$. From $a'$ the current passes through cell $d'$, thence to spring $a^2$, strip 4 (on commutator,) strip 5, spring $a^3$, cell $d^2$, spring $a^4$, strip 6, strip 7, spring $a^5$, cell $d^3$, spring $a^6$, strip 8, strip 9, spring $a^7$, cell $d^4$, spring $a^8$, strip 10, strip 11, connection 51, strip 12, contact-spring $b^{20}$, terminal $p^2$ to charging-line wire P. The current then continues its course through the conductor P and finally returns by way of the return-conductor R to the other terminal of the source N, whence it started. The current flowing in conductor P may of course be made to pass through a plurality of similar commutators and batteries—as, for instance, S S², Fig. 5—if so desired; but I have only described its course through one commutator S' and the associated cells thereof, as its operation in this case is similar to and typical of its operation in the other cases. It will be seen from the above description that the charging-current passes through the four cells $d'$ $d^2$ $d^3$ $d^4$ in series, this being the proper and usual manner of connecting up secondary batteries in a charging-circuit.

I will now trace the circuit of the second set of cells—that is to say, the four cells which are discharging through circuit X. In the position of commutator illustrated in Fig. 4 this set is composed of the four cells $f'$ $f^2$ $f^3$ $f^4$. These four cells, as I will now show, are connected up in series through the commutator. The wires T' and T², which are connected, respectively, to the contact-springs $b^2$ and $b^{19}$, Fig. 4, extend out to the translating device or devices which are comprised in the said circuit X. Starting from contact-spring $b^2$, the circuit may be traced through contact-strip 13, with which spring $b^2$ is in contact, thence to strip 14, spring $b^3$, cell $f'$, spring $b^6$, strip 15, strip 16, spring $b^7$, cell $f^2$, spring $b^{10}$, strip 17, strip 18, spring $b^{11}$, cell $f^3$, spring $b^{14}$, strip 19, strip 20, spring $b^{15}$, cell $f^4$, spring $b^{18}$, strip 21, strip 22, spring $b^{19}$, wire T² to the translating devices $g$ $g'$ $g^2$ $g^3$ and back by wire T' to contact $b^2$, thus completing the circuit. As in the case of the cells $d'$ $d^2$ $d^3$ $d^4$, which are being charged, the four cells $f'$, $f^2$, $f^3$, and $f^4$ are placed in series by means of my commutator as the last-described circuit clearly shows. There still remains a third set of cells to be accounted for—namely, $e'$, $e^2$, $e^3$, and $e^4$—and I will now proceed to show how these four cells are electrically separated from each other and individually connected up to the four circuits $z'$ $z^2$ $z^3$ $z^4$, for which they constitute, respectively, the sources of current-supply while the commutator is in its present position. As I have already stated, the springs $c'$ $c^2$ $c^3$, &c., are making contact with the commutator-strips along the line C C, Fig. 4. Consequently $c'$ is in contact with the commutator-strip 23. Current therefore flows from one terminal of the cell $e'$ through spring $c'$, strip 23, strip 24, spring $b^4$ to one terminal of the translating device $y'$, then from the other terminal of the said translating device $y'$ to spring $b^5$, strip 25 on the commutator, strip 26, spring $c^2$, and back to the other terminal of the cell $e'$, from which it started. It will be seen, therefore, that one terminal of the cell $e'$ is connected to one terminal of the translating device $y'$ and the other terminal of $e'$ to the other terminal of $y'$. In like manner the battery-cell $e^2$ can be shown to be connected to the translating device $y^2$. Thus one terminal of the said cell is connected to one terminal of $y^2$ through contact-spring $c^3$, strip 27, strip 28, and spring $b^8$, and the other terminal of the same cell is connected to the other terminal of $y^2$ through spring $c^4$, strip 30, strip 29, and spring $b^9$. The circuit of the next cell $e^3$ may be traced, starting from one terminal through spring $c^5$, strip 31, strip 32, spring $b^{12}$ to one terminal of $y^3$, and from the other terminal of $y^3$ through $b^{13}$, strip 33, strip 34, and spring $c^6$ to the other pole of the cell $e^3$. The cell $e^4$ in like manner has one terminal connected to one terminal of $y^4$ through spring $c^7$, strip 35, strip 36, and spring $b^{16}$, while the other terminal of the same cell $e^4$ is connected to the other terminal of $y^4$ through spring $c^8$, strip 38, strip 37, and spring $b^{17}$.

In practice there may be a number of other batteries connected up in series on the charging-circuit besides the one we have been considering. Consequently it is important that the charging-circuit should be kept closed at all times—that is, so long as the source N is delivering current for charging purposes. Therefore I provide the strips 41 42 43 at one end of the commutator, and the strips 44 45 46 at the other end of the commutator. I provide an electrical connection 52 to connect the three strips 41 42 43 together, and another connection 53 to connect strips 44 45 and 46 together, and I furthermore connect these two groups of three strips together by means of the wire or conductor 54, which is shown in dotted lines in Fig. 4. This conductor 54 is insulated from all strips under which it may pass. I provide a resistance $r'$ in the circuit of the said conductor 54, which resistance may be approximately equivalent to the resistance of four cells of the secondary battery which are used in connection with my commutator, or of any other suitable desired value. Furthermore, I make the spaces between any two adjacent strips on the end rows of the commutator—as, for example, between 1 and 41 or 39 and 43 or 44 and 11—so small that each of the springs $b'$ and $b^{20}$ will always be in contact with at least one of the commutator-strips while the said commutator is being rotated. Consequently, although during the rotation of the commutator and while the spring $b'$ is passing from strip 1 to 43 or from 39 to 42 or from 2 to 1 and the spring $b^{20}$ is making a like relative movement at the other end of the commutator, the charging-line P will be cut out of circuit with all the batteries $d'$, &c., $e'$, &c., and $f'$, &c. The said charging-line will nevertheless not be on open circuit, as it will be in contact with one or other of the strips 41, 42, or 43 at one end of the commutator and one or other of the strips 44 45 46 at the other end of the commutator and will consequently be closed through the shunt-circuit 54 and resistance. The charging-circuit therefore will never be open, although it need not necessarily have any battery in circuit.

The various circuits through which the batteries discharge will also be continuously in circuit with one or other of the cells or batteries of cells, owing to the fact that the contact-strips on the commutator are so arranged that during the rotation of said commutator a contact-spring—for example, $a'$, $c'$, or $b^3$—of any given cell $d'$ $e'$ $f'$, &c., will make contact with its respective contact-strip—say 14 or 23—before the preceding spring has ceased to make contact with the same strip.

As soon as the cells $d'$ $d^2$ $d^3$ $d^4$, which are now in circuit with the charging-line, have received a sufficient charge from the source N and it is desired to put another set of cells in circuit with the said charging-line it will be only necessary to rotate the commutator through one-third of a revolution—that is, through one hundred and twenty degrees. I will assume that the commutator has been so rotated in the direction shown by the arrow W, Fig. 4. Then by such rotation the row A A of contact-springs $a'$ $a^2$, &c., is brought into the position now occupied by row B B of contact-springs, while row C C is at the same time moved to occupy the position now occupied by row A A and row B B will occupy the position now held by row C C. Consequently the functions of the various battery-cells will all be changed, and the cells $d'$ $d^2$ $d^3$ $d^4$ will now be discharging through circuit X, cells $e'$ $e^2$ $e^3$ $e^4$ will be connected up to the charging-line, and $f'$ $f^2$ $f^3$ $f^4$ will be electrically separate from each other and will be connected up individually and respectively to the four circuits $Z'$ $Z^2$ $Z^3$ $Z^4$. Another rotation of the commutator in the same direction through another one hundred and twenty degrees will result in once more interchanging the functions of the three sets of cells, and $f'$, $f^2$, $f^3$, and $f^4$ will now be connected with the charging-line, $e'$, $e^2$, $e^3$, and $e^4$ will be connected up to the circuit X, and $d'$, $d^2$, $d^3$, and $d^4$ will be connected to the circuits $Z'$ $Z^2$ $Z^3$ $Z^4$.

From the foregoing explanation it will be seen that in the course of one complete revolution of the commutator $S'$ each one of the three sets of cells $d'$, &c., $f'$, &c., and $e'$, &c., will be put in circuit successively with the charging-line, the translating devices of circuit X, and the translating devices of circuits $Z'$ $Z^2$ $Z^3$ $Z^4$, and thus each and every cell will be called upon to perform approximately the same amount of duty and will in its turn receive an equal charge from the source N.

Fig. 6 illustrates the manner in which I arrange the circuit connections to the contact-springs $b^4$ $b^5$ $b^8$ $b^9$ $b^{12}$ $b^{13}$ $b^{16}$ $b^{17}$ when my commutator is used in conjunction with two circuits $Z^2$ $Z^3$ instead of four circuits $Z'$ $Z^2$ $Z^3$ $Z^4$, as in Fig. 4. It will be seen that exactly the same number of contact-springs are used in the B row of springs in the former as in the latter case, but that springs $b^4$ $b^5$ are connected in multiple circuit with $b^8$ $b^9$ to one circuit $Z^2$ and that $b^{12}$ $b^{13}$ are in like manner connected in multiple with $b^{16}$ $b^{17}$ to the other circuit $Z^3$. By using this mode of connection I am enabled to adhere to the above-described system of having four cells of battery in each group; but instead of using one cell only for each circuit $Z^2$ $Z^3$, I use two cells and connect them in multiple, as illustrated in Fig. 6.

In Fig. 5 I have illustrated a portion of a signal system to which my system for charging storage batteries is applicable. 101, 102, 103, and 104 designate portions of the tracks of a four-track railway. I have assumed each track to be divided into block-sections A A' A², &c., B B' B², &c., C C' C², &c., D D' D², &c., by means of insulation $a$ $a$, &c., and the entry of trains to each of the said block-sections as being controlled by a signal E E' E², &c., F' F² F³, &c., G G' G², &c., H' H² H³, &c. For example, the signal E controls the entrance of trains to block-section A, E' in like manner controls the entrance of trains to block-section A', E² to A², F² to B², G' to C', H³ to D³, and so on. For the sake of simplifying this description I have shown all block-sections as being equal in length and the ends of all block-sections on track 101 as being adjacent the ends of like block-sections on tracks 102, 103, and 104. Furthermore, I have shown each block-section as comprising only one track-circuit, which extends from one end of the block-section to the other. Each track-circuit consists of a source of current-supply $q'$ $q^2$ $q^3$, &c., $r$ $r'$ $r^2$, &c., $s'$ $s^2$ $s^3$, &c., and $t$ $t'$ $t^2$, &c., a relay device $j$ $j'$ $j^2$, &c., $k'$ $k^2$ $k^3$, &c., $l$ $l'$ $l^2$, &c., $m'$ $m^2$ $m^3$, &c., adapted to respond in the movement of its armature to the presence or absence in its coils of current derived from the said source and of the track-rails which are adapted to conduct current from any one of the said sources to the relay device which forms part of the same track-circuit as the said source. This general arrangement of block-sections is one that is frequently carried out in practice, and it has the advantage of enabling the signals to be arranged in groups of four, as shown in Fig. 5, one signal of each of the said groups of four controlling, respectively, the movements of trains on one track—as signal E', for example, which controls the movements of trains on track 101 between E' and E, or H², which controls the movements of trains on track 104 between H² and H³. For convenience I have shown each group of four signals as being mounted on a signal-bridge K K' K², this being a usual manner of installing block-signals on a four-track road. It will be seen that adjacent each signal-bridge there are located four sources of current-supply for track-circuits—as, for instance, adjacent bridge K' the sources $q^2$ $r'$ $s^2$ $t'$—and likewise a source of current-supply L', which is used for the operation of the four signals on bridge K'. All the above-described sources of current-supply, both for track-circuits and for signals, are secondary cells, and these secondary cells are charged from a common source N, which may be located at any convenient place adjacent the railway, P and P' being main conductors through which the charging-current for the various secondary cells is conveyed from the said common source N to the various commutators S S' S², &c., which are respectively located adjacent the signal-bridges K K' K², &c. The said commutators S S' S² may be of like construction to the commutator hereinbefore described in detail. Referring to the said description and to Fig. 4 particularly, the four relay devices at any specific location—as, for example, relays $j'$, $k^2$, $l'$, and $m^2$ at signal-bridge K'—correspond to the translating devices which derive current through circuits $Z'$, $Z^2$, $Z^3$, and $Z^4$, and in like manner the operating-motors of signals E', F², G', and H² derive their current through a signal-controlling circuit which corresponds to circuit X. Each of the three batteries or sets of cells in the foregoing description is similar to the other two batteries, both as regards the number of cells it comprises and also as regards the size and type of cells employed.

What I claim as my invention is—

1. In combination with a plurality of block-sections, each comprising a track-circuit and a signaling-circuit, of three sets or batteries of four secondary cells, a source of electric current for charging the said cells, and a circuit-controlling apparatus adapted to be moved successively into three different positions and by such successive movement to shift or change the connections between the said sets of cells and the said circuits so that each set of cells in turn will be connected with the source of charging-current, and that while one set of cells is so connected a second set of cells will be connected in series to a signaling-circuit and a third set of cells will be divided into units of one cell each and each of said cells will be individually connected to discharge through a track-circuit.

2. In a railway signaling system having one or more tracks divided into block-sections, each block-section comprising a signal-circuit and a track-circuit, the combination with a plurality of storage or secondary cells, a source of current-supply for charging said cells, and a circuit-controlling apparatus adapted to electrically arrange the said cells in groups and to interchange the functions of said groups so that each group of cells will successively be connected to the source of charging-current supply, the signal-circuits and the track-circuits.

3. In combination with a block-section of a railway signaling system, a track-circuit, and a signal-circuit for said block-section, three sets of storage-cells, a charging-circuit and means for successively connecting the three sets of cells with the track and signal circuits and with the charging-circuit.

4. In a railway signaling system having one or more tracks divided into block-sections, each block-section comprising a signaling-circuit and a track-circuit, the combination with a plurality of storage or secondary cells, a source of current-supply for charging the said cells, and a circuit-controlling apparatus adapted to electrically arrange the said cells in three sets and to successively interchange the functions of said sets so that one set is placed in series in the charging-circuit while another set is placed in series in the signaling-circuit and the third set is divided into two or more sets and each set is used as a source of current-supply for one of said track-circuits.

In testimony whereof I have signed my name to this specification in the presence of two subscribed witnesses.

IRA S. RAYMER.

Witnesses:
J. H. GWYNNE,
GEORGE R. BOVARD.